Patented Feb. 10, 1942

2,272,400

UNITED STATES PATENT OFFICE 2,272,400

TERPENE ESTERS

Joseph N. Borglin, Wilmington, Del., assignor to Hercules Powder Company, Wilmington, Del., a corporation of Delaware No Drawing. Application March 23, 1940,
Serial No. 325,613

23 Claims. (Cl. 260—454)

This invention relates to terpene thiocyanoacyl esters and esters of like structure and more particularly it relates to thiocyanoacyl and other negatively substituted acyl esters of terpene polyhydric alcohol radicals and to a method for their preparation.

Terpene thiocyanoacyl esters may be prepared in general by treating unsaturated terpene compounds or saturated terpene alcohols with a halogen substituted carboxylic acid, or in the case of the alcohols alternatively with anhydrides of such acids, and then treating the halogen substituted acyl ester formed in this manner with a metal thiocyanate or other salt as described in my application, Serial No. 198,687, filed March 29, 1938 Patent No. 2,217,611 and in my application Serial No. 311,167, filed December 27, 1939 Patent No. 2,217,613. However, when terpin and other terpene polyhydric alcohols, especially those with hydroxyls upon tertiary carbon atoms, are treated in this manner, relatively low yields of the desired thiocyanoacyl or other negatively substituted acyl esters are obtained because of the tendency of the polyhydric alcohols mentioned to split off water and thus lose the hydroxyl groups under the normal conditions of the esterification reaction.

I have now found that the desired thiocyanoacyl and like esters can be prepared in high yields from terpene polyhydric alcohols by treating these alcohols with a halogen substituted acylating agent in the presence of a mildly basic catalyst and thereafter treating with a metal thiocyanate, selenocyanate, or a tellurocyanate. Thus, in accordance with this invention, I react a terpene polyhydric alcohol with a halogen substituted organic carboxylic acid anhydride in the presence of a mildly basic catalyst. The resulting product is an acyl ester of the terpene polyhydric alcohol with a halogen substituent upon the acyl group. I then react this ester with a metal thiocyanate, a metal selenocyanate, or a metal tellurocyanate which is reactive under the conditions employed, whereby there is obtained a thiocyanoacylate, or a selenocyanoacylate, or a tellurocyanoacylate of the polyhydric terpene alcohol employed. In a broader sense, in accordance with this invention, I react any negatively substituted organic carboxylic acid anhydride with a terpene polyhydric alcohol such as a terpin and obtain thereby a negatively substituted acyl ester of the terpene polyhydric alcohol employed. If desired, I may then react this ester further to modify the negative substituent.

The polyhydric terpene alcohol which I employ may be any terpene compound having two or more hydroxyl groups on terpenic carbon atoms thereof such as, for example, terpin, terpin hydrate, sobrerol, sobreroerythritol, pinol glycol, beta-pinene glycol, etc. The method in accordance with this invention has particular value when applied to the preparation of terpin derivatives of the character mentioned since terpin carries both its hydroxyl groups upon tertiary carbon atoms and is thus very readily dehydrated under the acid conditions of the usual esterification procedure.

Suitable halogen substituted organic carboxylic acid anhydrides which I may utilize are such as, for example, monochloroacetic anhydride, dichloroacetic anhydride, trichloroacetic anhydride, alpha-chloropropionic anhydride, beta-chloropropionic anhydride, dichloropropionic anhydride, alpha, beta, or gamma-chlorobutyric anhydride, dichlorobutyric anhydride, chloromalonic anhydride, chlorolauric anhydride, chlororicinoleic anhydride, chlorostearic anhydride, chloro-oleic anhydride, chlorobenzoic anhydride, chloromethylbenzoic anhydride, chloromethylphthalic anhydride, chloroethylbenzoic anhydride, chloronaphthenic acid anhydride, chlorovaleric anhydride, chlorocaproic anhydride, etc., and similar corresponding bromine, iodine, and fluorine substituted carboxylic acid anhydrides. Mixtures of acylating agents may be used, if desired, as may be chemically mixed acid anhydrides.

The mildly basic catalyst which I utilize in the reaction according to this invention may be a basic inorganic salt, such as, for example, sodium acetate, potassium acetate, lithium acetate, ammonium acetate, sodium formate, potassium formate, lithium formate, ammonium formate, sodium propionate, potassium propionate, lithium propionate, ammonium propionate, sodium butyrate, potassium butyrate, lithium butyrate, ammonium butyrate, sodium oxalate, sodium glycollate, sodium lactate, salts in general of a base and a relatively weaker acid, etc. Again, it may be an organic base, such as, for example, pyridine, quinoline, pyrol, strychnine, tetrahydroquinoline, etc., compounds containing amino or ammoniacal nitrogen being in general suitable.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make a selenocyanoacylate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. Thus, according to this procedure the terpene polyhydric alcohol is first reacted with the halogen substituted carboxylic acid anhydride in the presence of the mildly basic catalyst. This is conveniently carried out by mixing the terpene polyhydric alcohol with the halogen substituted acid anhydride and the catalyst and allowing the mixture to stand for a period of time sufficient to substantially complete the reaction. Occasional or continuous agitation may be employed if desired. Stoichiometric proportions of the reactants may be employed but, in general, I prefer to use an excess of the acid anhydride. I may use an amount of mildly basic catalyst within the range of about 0.1% to about 25% by weight of the terpene polyhydric alcohol where a mildly basic inorganic salt is utilized. Larger quantities are unnecessary but will, as a rule, cause no difficulty where an excess of anhydride is employed. When mildly basic organic compounds are utilized as catalysts, they are preferably used in a somewhat larger quantity than in the case of the inorganic catalyst. Organic catalysts may be used in quantity several times as great as the terpene polyhydric alcohol, if desired.

The time required to complete the reaction will depend somewhat upon the particular reactants, catalysts, and temperature employed. At room temperature using sodium acetate, for example, a period of time between about ½ and about 50 days may be employed. Although it is convenient merely to mix the reactants and allow them to stand for a few days at ordinary room temperatures, the reaction will occur at lower temperatures, say as low as about 0° C. The temperature may be raised somewhat if desired, say to as high as about 100° C. to speed up the reaction to substantial completeness in a few hours in the presence of the mildly basic catalyst. However, it has been found that the loss of reactants due to dehydration of the terpene polyhydric alcohol increases as the temperature is raised, so that increased rate of reaction is usually accompanied by loss in yield.

The resulting terpene polyester is desirably then isolated from any by-products of the reaction and any unreacted reagents present. This is conveniently carried out by adding water-immiscible organic solvents such as benzene, petroleum ether, carbon tetrachloride, ethylene dichloride, chloroform, etc. to the reaction mixture, filtering off any solids, and then washing the organic solvent solution with water until it has been freed of acidic materials and any catalyst which may be present. Where an organic basic catalyst is employed, it is desirable to remove it from the organic solvent solution by a number of washes with dilute hydrochloric acid in water followed by washes with pure water to remove residual acid.

The first stage ester is then reacted with the metal thiocyanate, selenocyanate, or tellurocyanate as the case may be, preferably after removing most of the organic solvent present by evaporation. This second stage is preferably carried out in the presence of a suitable inert solvent, such as methanol, ethanol, propanol, isopropanol, butanol, acetone, ethyl acetate, etc. The reaction may be carried out at any temperature within the range between 0° C. and about 200° C. but preferably the temperature is maintained at a temperature between about 30° C. and about 150° C. After the reaction has been completed, the unreacted thiocyanate, selenocyanate, or tellurocyanate is preferably completely removed from the product, for example, by washing with water.

The negatively substituted acylates of the first stage reaction are light in color if the reaction is carried out in the absence of oxygen, for example, under a blanket of $CO_2$. Substantially water-white esters may be obtained by vacuum distillation. The color of the thiocyanoacylate products follows the color of the first stage ester from which they are prepared. Where very light colored products are desired and where it is desired to insure products of no odor or minimum odor, the first stage reaction may be conducted, if desired, in a non-oxidizing atmosphere, or the first stage product may be vacuum distilled, or both these measures may be taken. In addition, the second stage may be carried out in a non-oxidizing atmosphere, where minimum color or product is desired.

The ester produced by the hereinabove described method has the type formula

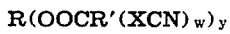

$$R(OOCR'(XCN)_w)_y$$

in which R is a radical of a terpene polyhydric alcohol, in which R' is an organic radical, in which X is sulphur, selenium, or tellurium, in which $w$ is a small whole number, usually one, and in which $y$ is a small whole number, i. e. a whole number less than about five. Where the terpene polyhydric alcohol is fully esterified, $y$ will correspond to the original number of hydroxyls of the terpene radical. Thus, for example, under these conditions, where R represents terpin, $y$ will be 2. It will be appreciated that R' forms the body of an acyl group. Thus, for example, when a halogen substituted fatty acid anhydride or other aliphatic acid derivative with or without other substituents is utilized, the R' will be an aliphatic radical. Similarly, when the anhydride of a halogen substituted naphthenic acid is employed, the R' will be an alicyclic radical, etc.

The method in accordance with this invention provides further a means of preparing negatively substituted acyl esters of terpin and other polyhydric terpene alcohols. The halogen substituted acyl esters resulting from the first stage reaction hereinbefore described are examples of negatively substituted acyl esters of terpene polyhydric alcohols. Other negative substituents which may replace the halogen substituents in acyl groups of the character hereinbefore mentioned are groups or elements capable of carrying a negative charge if ionized or capable of acting as the negative portion of a salt or ester, for example, such groups as nitro, nitroso, nitric, sulphonic, cyano cyanic, oxy, sulpho, hydrosulpho, seleno, hydroseleno, mercapto, hydroxy, alkoxy, aroxy, amino, imino, thiocyano, selenocyano, tellurocyano, aceto, formic, propiono, benzoyl, etc.

The negatively substituted acyl esters provided according to this invention have the type formula $R(OOCR'Z_w)_y$ in which R is a radical of a terpene polyhydric alcohol, in which R' is an organic radical, in which Z is a negative substituent of R', in which $w$ is a small whole number, usually one, and in which $y$ is a small whole number. It will be appreciated that there may be more than one negative substituent symbolized by Z.

The negatively substituted acyl esters are prepared by reacting the correspondingly substituted organic carboxylic acid anhydrides with the terpene polyhydric alcohols in the manner hereinbefore described for the halogen substituted acyl esters. For example, organic carboxylic acid anhydrides such as the halogen substituted anhydrides hereinbefore mentioned, but negative groups such as those mentioned in place of the halogen, may be utilized. Thus, thiocyanoacyl and similar esters of terpene polyhydric alcohols may be prepared in one step by employing the corresponding carboxylic acid anhydride. Alternatively the halogen substituted acyl ester may first be prepared and the halogen substituent replaced by another negative substituent, for example by treatment with an alkali metal salt, a silver salt, a lead salt, or other metal salt; or by hydrolysis; or by hydrolysis followed by esterification; or by ammonolysis, etc.

The method in accordance with this invention will be further illustrated by the examples which follow. All parts and percentages herein are by weight unless otherwise specified. In the examples following, the terpin utilized was the 1:8 form which may be prepared, for example, by the partial dehydration of 1:8 terpin hydrate. The terpin used in the examples was prepared from terpin hydrate by heating at a temperature of about 113° C. until the evaporation of water vapor ceased.

*Example I*

100 parts of terpin, 238 parts of monochloroacetic anhydride, and 30 parts of anhydrous sodium acetate were mixed and allowed to stand for 39 days at room temperature in a closed container. About 240 parts of a 2:1 mixture of benzol and petroleum ether were then added to the reaction mixture. The resulting mixture was then filtered. The filtrate was washed with water until free of acid. The solvents were then removed by distillation under reduced pressure in an atmosphere of carbon dioxide. A yield of 95 parts of terpin di-(chloroacetate), which analyzed 14.7% chlorine, was obtained.

86 parts of the terpin di-(chloroacetate), 60 parts of sodium thiocyanate, and 160 parts of 95% ethyl alcohol were mixed and heated under reflux, while blanketed under carbon dioxide, for one hour at a temperature of 65–80° C. Salts present were then filtered off and a portion of the alcohol removed by heating under reduced pressure in an atmosphere of carbon dioxide. About 320 parts of a 1:1 mixture of ethyl ether and benzol were then added to the reaction solution. The resulting mixture was then washed with water until free of sodium thiocyanate. Volatile solvents were then removed by heating under reduced pressure in an atmosphere of carbon dioxide. A yield of 35 parts of terpin di-(thiocyanoacetate) was recovered. The product analyzed 15% sulfur and 0.4% chlorine.

*Example II*

100 parts of terpin 265 parts of alpha-chloropropionic anhydride (prepared by vacuum distillation of a mixture of alpha-chloropropionic acid and phosphorous pentoxide), and 30 parts of anhydrous sodium acetate were mixed and allowed to stand for 39 days at room temperature in a closed container. At the end of this period about 240 parts of a 2:1 mixture of benzol and petroleum ether were added to the resulting mixture. The resulting mixture was then washed with water until free of acid. Upon removal of the solvents by heating under reduced pressure in an atmosphere of carbon dioxide, a yield of 82 parts of the terpin di-(alpha-chloropropionate) was obtained. The product analyzed 14.9% chlorine.

A mixture of 73 parts of the di-(chloropropionate), 45 parts of sodium thiocyanate and 140 parts of 95% ethyl alcohol was heated under reflux in an atmosphere of carbon dioxide for two hours using a heating bath at a temperature of 65–80° C. The salt present was then filtered off and a portion of the alcohol was removed from the filtrate by heating under reduced pressure in an atmosphere of carbon dioxide. About 400 parts of a 1:1 mixture of ethyl ether and benzol were then added and the resulting mixture was then washed with water until free of sodium thiocyanate. Volatile solvents were then removed by heating under reduced pressure in an atmosphere of carbon dioxide. A yield of 57 parts of di-(alpha-thiocyanopropionate) was obtained.

*Example III*

12 parts of terpin, 25 parts of alpha-bromo-N-butyric anhydride (prepared by vacuum distillation of the corresponding acid from phosphorous pentoxide), and 4 parts of anhydrous sodium acetate were mixed and maintained for 14 days at room temperature and for 4 days in a bath at a temperature of 50–85° C. The reaction mixture was then extracted with about 100 parts of 2:3 mixture of benzol and petroleum ether. The extract was then repeatedly washed with water until free of acid. The solvents were then removed by heating under reduced pressure and a yield of 6 parts of terpin di-(alpha-bromo-N-butyrate) analyzing 20.4% bromine was obtained.

3 parts of the first stage ester, 3 parts of sodium thiocyanate, and 20 parts of ethyl alcohol were mixed and heated under reflux in an atmosphere of carbon dioxide in a heating bath at a temperature of 65–80° C. Most of the alcohol was then removed by heating under reduced pressure in an atmosphere of carbon dioxide. About 65 parts of a 1:1 mixture of ethyl ether in benzol were then added and the resulting mixture was washed with water until free of sodium thiocyanate. Volatile solvents were removed by heating under reduced pressure in an atmosphere of carbon dioxide. A yield of 2.5 parts of terpin di-(alpha-thiocyano-N-butyrate) analyzing 8.4% sulfur and 1.1% bromine was obtained.

The products of the above examples contain unesterified terpene compounds and hydrocarbons to some extent. A certain portion of the original reactant is usually not esterified and, in addition, there may be some conversion of esters to terpene hydrocarbons in the reactions. The unesterified terpene compounds and terpene or other hydrocarbons present may be removed by vacuum distillation or vacuum steam distillation, if desired. However, such removal is, in general, of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

Chemically mixed esters of polyhydric terpene alcohols may be prepared by the method according to this invention by the employment of a mixture of negatively substituted organic acid anhydrides or by using chemically mixed anhydrides. Alternatively, part of the hydroxyls available may first be esterified with a limited quantity of one anhydride (preferably the weaker) and then remaining hydroxyls esterified by the second anhydride.

The method in accordance with this invention has the advantage that terpene polyhydric alcohols, especially those unstable under the usual conditions of esterification, may be reacted to give the desired products in good yield. The new compounds now available in accordance with this invention are useful in insecticides, for example, they may be used in 0.5–20% solutions in kerosene, with or without other toxic agents such as pyrethrum, rotenone, etc., for fly sprays and the like, or in emulsions, or on solid carriers, etc. The thiocyanoacylates are preferred for this purpose. They also find use in the flotation of minerals and may be used in the preparation of wetting agents by treatment with strong oxidizing agents such as nitric acid. The halogen substituted acylates are useful as intermediates for many products and also are valuable as plasticizers for cellulose esters or ethers such as nitrocellulose, cellulose acetate, ethyl cellulose, etc.

The term "terpin" as used herein includes both the 1:8 and the 1:4 modifications. The term "di-(thiocyanoacylate)" and like terms as used herein refer to esters in which there are two thiocyanoacyl groups, the "di-" referring to the number of acyl groups in the compound. Similarly, in the term "poly-(thiocyanoacylate)" and the like, the "poly-" refers to the number of acyl groups present in the ester, "poly-" meaning two or more. It will be appreciated, of course, that it is possible to have two or more thiocyano groups on one acyl group as, for example, when di-chloropropionic anhydride, which carries two chlorine atoms on each propionyl group, is utilized in the first stage reaction.

This application is a continuation-in-part of my previous application, Serial No. 311,167, filed December 27, 1939, Patent No. 2,217,613, which is in turn a continuation-in-part of my application, Serial No. 198,687, filed March 29, 1938, Patent No. 2,217,611, entitled "Terpene cyanoacyl compounds and method of producing same."

It will be understood that the details and examples hereinbefore set forth are illustrative only, and that the invention as broadly described and claimed is in no way limited thereby.

What I claim and desire to protect by Letters Patent is:

1. A new terpene compound having the type formula $R(OOCR'Z_w)_y$ in which R is a radical of a terpene polyhydric alcohol, in which R' is a hydrocarbon radical, in which Z is a negative group, and in which $w$ and $y$ are small whole numbers.

2. A new terpene compound having a type formula $R(OOCR'(XCN)_w)_y$ in which R is a radical of a terpene polyhydric alcohol, in which R' is a hydrocarbon radical, in which X is a member of the group consisting of sulfur, selenium, and tellurium, and in which $w$ and $y$ are small whole numbers.

3. A poly-(thiocyanoacylate) of a terpene polyhydric alcohol.

4. A new terpene compound having the type formula $R(OOCR'Z_w)_2$ in which R is the radical of terpin, R' is a hydrocarbon radical, Z is a negative group, and $w$ is a small whole number.

5. A new terpene compound having the type formula $R(OOCR'(XCN)_w)_2$ in which R is the radical of terpin, in which R' is a hydrocarbon radical, in which X is a member of the group consisting of sulfur, selenium, and tellurium, and in which $w$ is a small whole number.

6. A terpin di-(thiocyanoacylate).
7. A terpin di-(thiocyanoacetate).
8. A terpin di-(thiocyanopropionate).
9. A terpin di-(thiocyanobutyrate).

10. A method for the preparation of a compound of the type formula according to claim 1 which comprises treating a terpene polyhydric alcohol with a negatively substituted organic carboxylic acid anhydride in the presence of a mildly basic catalyst.

11. A method for the preparation of a compound of the type formula according to claim 1 which comprises treating terpin with a halogen substituted organic carboxylic acid anhydride in the presence of a mildly basic catalyst.

12. A method for the preparation of a compound of the type formula according to claim 1 which comprises treating terpin with a halogen substituted aliphatic carboxylic acid anhydride in the presence of sodium acetate.

13. A method for the preparation of a compound of the type formula according to claim 2 which comprises treating a terpene polyhydric alcohol with a halogen substituted organic carboxylic acid anhydride in the presence of a mildly basic catalyst and then with a compound selected from the group consisting of metal thiocyanates, metal selenocyanates, and metal tellurocyanates at least partially soluble in the reaction mixture.

14. A method for the preparation of a compound of the type formula according to claim 2 which comprises treating a terpene polyhydric alcohol with a halogen substituted aliphatic carboxylic acid anhydride in the presence of a mildly basic catalyst and then with a metal thiocyanate at least partially soluble in the reaction mixture.

15. A method for the preparation of a compound of the type formula according to claim 2 which comprises treating terpin with a halogen substituted organic carboxylic acid anhydride in the presence of a mildly basic catalyst and then with a compound from the group consisting of metal thiocyanates, metal selenocyanates, metal tellurocyanates at least partially soluble in the reaction mixture.

16. A method for the preparation of a terpin di-(thiocyanoacylate) which comprises treating terpin with a halogen substituted aliphatic acid anhydride in the presence of a mildly basic catalyst and then with a metal thiocyanate at least partially soluble in the reaction mixture.

17. A method for the preparation of a terpin di-(thiocyanoacetate which comprises treating terpin with a halogen substituted acetic anhydride in the presence of a mildly basic catalyst and then with an alkali metal thiocyanate.

18. A method for the preparation of a terpin di-(thiocyanopropionate) which comprises treating terpin with a halogen substituted propionic anhydride in the presence of a mildly basic catalyst and then with an alkali metal thiocyanate.

19. A method for the preparation of a terpin di-(thiocyanobutyrate) which comprises treating terpin with a halogen substituted butyric anhydride in the presence of a mildly basic catalyst and then with an alkali metal thiocyanate.

20. A method for the preparation of a compound in accordance with claim 1 which comprises treating a terpene polyhydric alcohol with a negatively substituted organic carboxylic acid anhydride in the presence of sodium acetate.

21. A method for the preparation of a compound in accordance with claim 2 which comprises treating terpin with a halogen substituted aliphatic carboxylic acid anhydride in the presence of sodium acetate and then with a compound from the group consisting of metal thiocyanates, metal selenocyanates, metal tellurocyanates at least partially soluble in the reaction mixture.

22. A method for the preparation of a compound in accordance with claim 1 which comprises treating a terpene polyhydric alcohol with a negatively substituted organic carboxylic acid anhydride in the presence of pyridine.

23. A method for the preparation of a compound in accordance with claim 2 which comprises treating terpin with a halogen substituted aliphatic carboxylic acid anhydride in the presence of pyridine and then with a compound from the group consisting of metal thiocyanates, metal selenocyanates, metal tellurocyanates at least partially soluble in the reaction mixture.

JOSEPH N. BORGLIN.